United States Patent Office 3,273,796
Patented Sept. 20, 1966

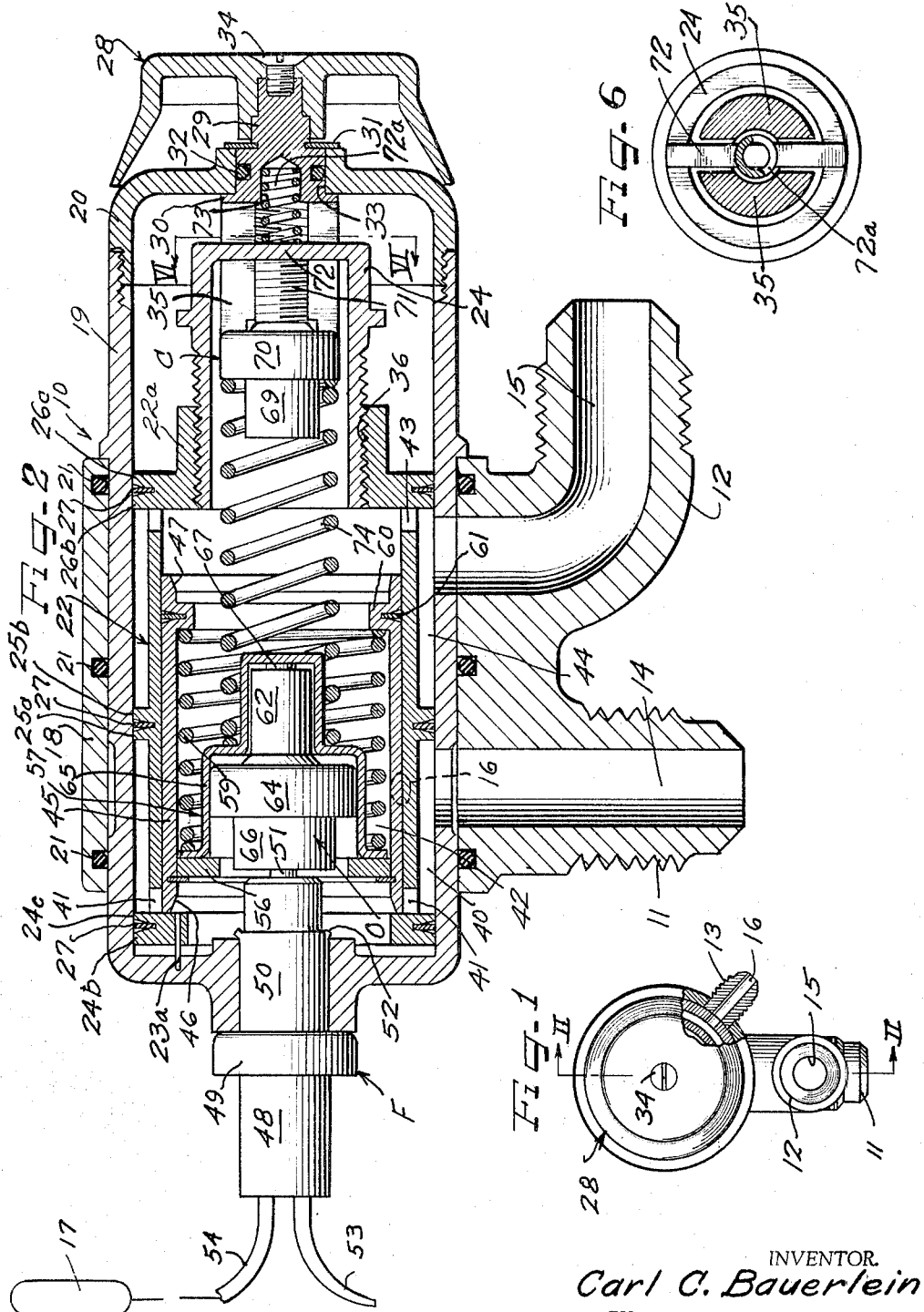

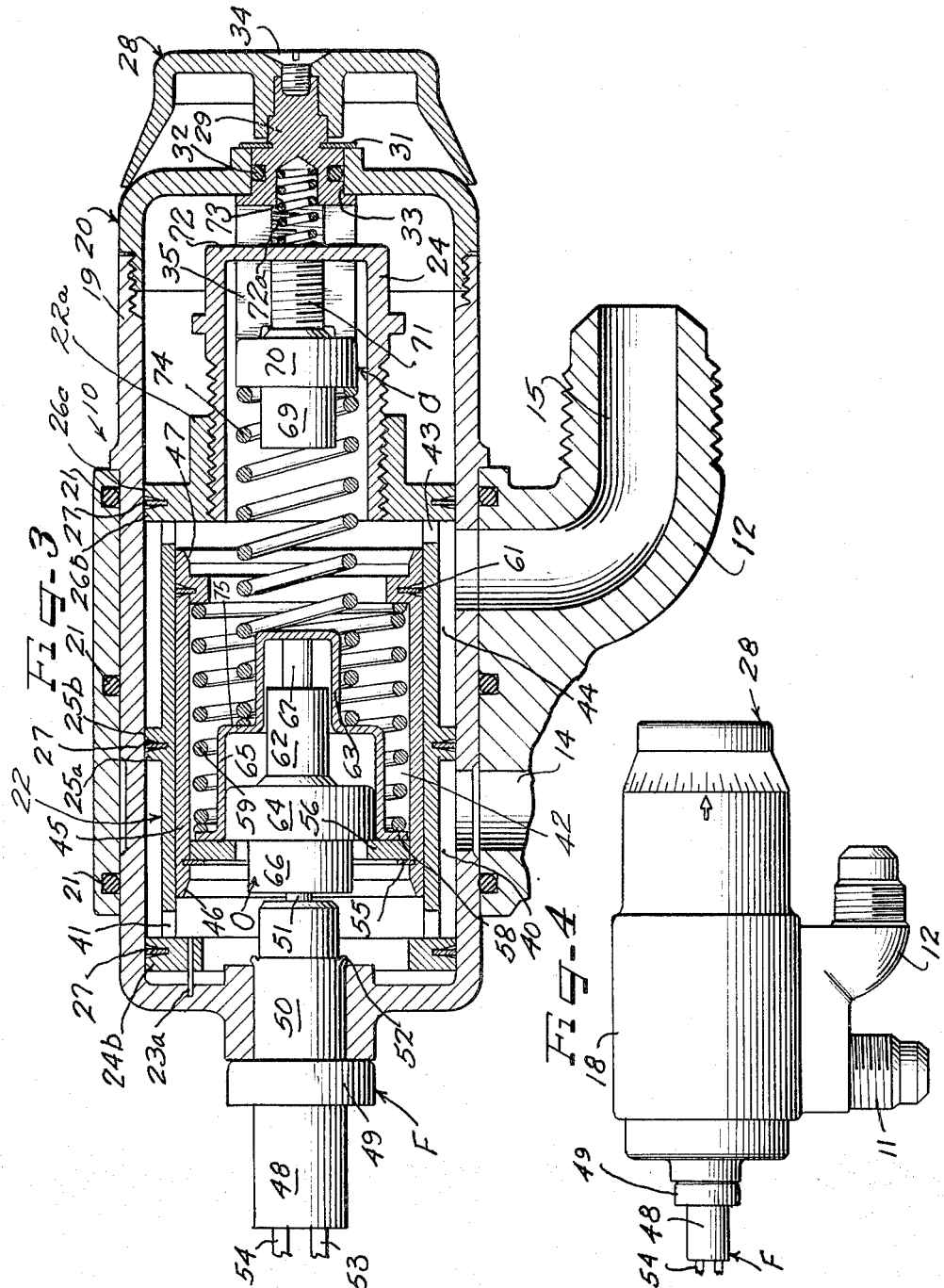

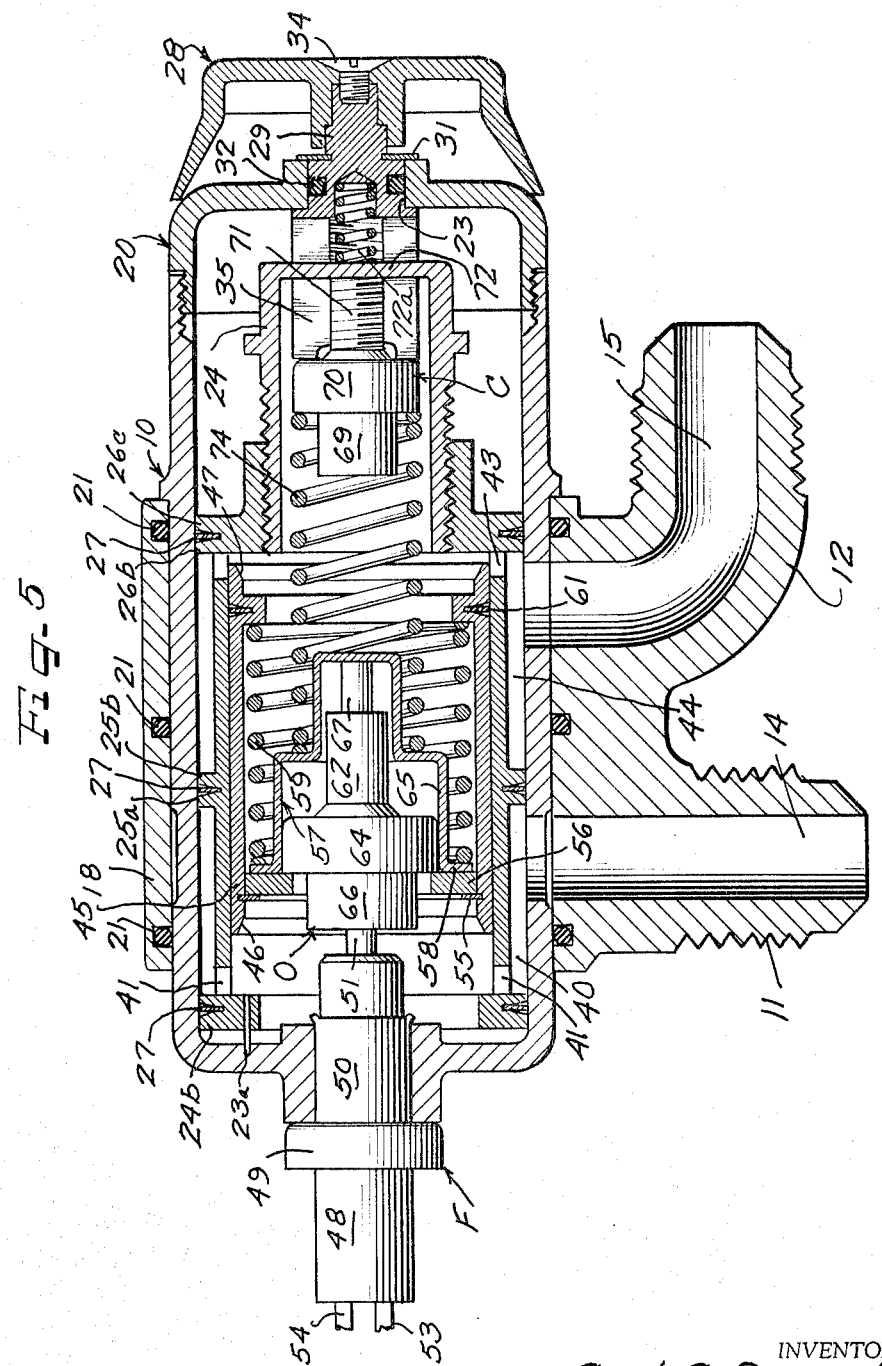

3,273,796
HEATING AND COOLING ZONE VALVE BY-PASS
Carl C. Bauerlein, Clearwater, Fla., assignor to The Dole Valve Company, Morton Grove, Ill., a corporation of Illinois
Filed Mar. 23, 1964, Ser. No. 353,854
16 Claims. (Cl. 236—1)

The present invention relates to fluid control valves and more particularly relates to a zone valve for use in controlling the flow of water through a household heating and cooling system as a function of both the temperature in a given zone and as a function of the temperature of water contained within the system itself.

The zone control valve illustrated in the drawings appended hereto includes a temperature sensitive power unit having a thermal-sensing bulb, which may be positioned at a point remote from the valve body, and which is communicable through a capillary with a power unit mounted on the valve body. The power unit is effective to control the flow of water through the valve unit as a function of temperature ambient the bulb.

A single sleeve type valve member is employed to control the flow of water through the valve and means are provided so that the valve member can be oriented to shut off the flow of water through the valve when temperatures ambient the sensing bulb rises or, conversely, to shut off water flow through the valve when temperatures ambient the bulb falls below a predetermined level. In this manner the zone valve can be employed to control the flow of water to a radiator irrespective of whether hot water is directed through the system to heat the radiator or, conversely, cold water is fed through the system to effect cooling of the zone radiator. The zone will be heated or cooled depending upon whether hot or cold water is directed to the radiator. The present invention is in fact directed to a zone control valve which is effective to orient itself for heating or cooling control in accordance with the temperature of the water itself so that manual adjustment of the valve is unnecessary.

It has been noted that temperature sensitive power units which are exposed to high ambient temperatures over long periods of time tend to overextend themselves and their power members move extensibly from the casing of the elements a greater distance than desired for the temperature of the fluid ambient the unit. Such overextension is caused by swelling of the rubber parts within the unit.

In addition, the valve structure which I have devised is adapted to be energized both through direct contact with hot water and by thermal conduction through contacting metal parts and some means must be provided to damp energization of the power unit in the former case so that there is no great change in the assembly when the change is made from indirect to direct heating of the power unit. The valve which I have devised employs means to compensate for this overextension and to damp the power output of the unit so that power unit energization can be accurately correlated with the temperature of the water flowing to the valve.

In view of the foregoing, it is a principal object of the present invention to provide a zone control valve which is effective to control the flow of water directed to it both as a function of a temperature ambient a thermal bulb disposed remotely from the valve and as a function of the temperature of liquid directed to the valve.

Another object of the invention resides in the provision of means for compensating for the overextension of a temperature sensitive power unit caused by prolonged exposure to fluids under high temperature and for damping the effective power output thereof under given conditions.

These and other objects, features and advantages of my invention will become apparent from time to time as the following specification proceeds and with reference to the accompanying drawings, wherein:

FIGURE 1 is an end view of a valve constructed according to the principles of this invention;

FIGURE 2 is a vertical sectional view through the valve unit shown in FIGURE 1 and taken along lines II—II of FIGURE 1;

FIGURE 3 is a vertical sectional view of the valve unit which is similar in nature to FIGURE 2 but which shows the parts in a different operating position from that shown in FIGURE 1;

FIGURE 4 is a side elevational view of the valve;

FIGURE 5 is a third vertical sectional view through the valve and showing the parts in still another operating position; and FIGURE 6 is a sectional view taken substantially along lines VI—VI of FIGURE 2.

The valve unit illustrated in the drawings comprises generally a valve body 10 having an inlet nipple 11, an outlet nipple 12, and a bypass nipple 13 which, in turn, has inlet, outlet and bypass passageways 14, 15, and 16, respectively, formed therein. The valve unit is adapted to be connected in a heating/cooling system with the inlet nipple 11 and bypass nipple 13 connected to piping leading to the boiler so that water can continuously be circulated from the boiler through the nipples 11 and 13 and the valve body and thence back to the boiler. The nipple 12 is of course adapted to be connected through suitable piping to either a single room radiator or to several radiators in a given zone. The valve is adapted to control the flow of hot or cold water from the boiler to the radiator in accordance with the temperature of water in the inlet passageway 14 and in accordance with the temperature ambient a temperature sensing bulb 17 and in accordance with manual adjustment of the valve.

The valve body 10 is a three-part assembly consisting of a band-section 18 which is fitted around and sealed to an elongated cylindrical section 19 which, in turn, has an end cap 20 fitted on the open end thereof. The band-section 18 is sealed to the cylindrical section 19 by means of a plurality of O-ring seals 21 which lie within ring grooves formed on the inner wall of the band-section 18 at spaced intervals. The end cap 20 is threadedly mounted on the cylindrical section 19.

A cage 22 is slidably mounted within the valve body 10 and is cylindrical in configuration and has a radially reduced cylindrical sleeve 24 threadedly mounted in a reduced neck 22a thereof.

The cage 22 has three spaced annular ribs 24b, 25b and 26b which have bearing faces 24c, 25c and 26c engageable with the inner wall of the cylindrical section 19 and has resilient annular seals 27 mounted within grooves formed in the bearing faces to seal the several ribs to the inner wall of the cylindrical section 19.

The cage 22 is manually axially movable within the cylinder 19 by an adjusting knob 28 which is mounted on the end of the valve body and which is keyed to a shaft 29 which, in turn, is centrally journalled within the end wall of the cap 20. The shaft 29 has a flared end 30 which is engageable with the inner surface of the cap 20 and an annular retainer 31 is snapped on the shaft and is engageable with the outer surface of the cap 20 to maintain the shaft 29 in its journalled position in the cap 20. A seal 32 is fitted within a groove formed about the shaft 29 and is engageable with the bore wall 33 which receives the shaft to provide a fluid-tight seal between the bore and the shaft. The adjusting knob 28 is, as has been said, keyed to the shaft 29 and is secured thereon by a screw 34. A pair of semicylindrical legs 35 are formed integrally with the flange portion 30 of the shaft 29 and embrace opposite sides of bridge 72 extending across the open end of cylindrical sleeve 24. The legs 35 are threadedly secured to the guide portion 71 of a power unit C. Rotation of the shaft 29 by movement of the knob 28 will then cause the sleeve 24 to rotate also. The sleeve 24 is threadedly mounted within the cage 22 as at 36 and the cage 22 is keyed against rotation within the elongated cylinder 19 by pin 23a so that upon rotation of the sleeve 24 there will be relative rotation between that bracket and the cylindrical cage 22 at the threads 36 and axial movement of the cage 22 will thereby be effected.

An inlet passage 40 is communicable with the inlet passageway 14 and opens through an inlet port 41 formed within the cage 22 to a chamber 42 within the cage 22. An outlet port 43 opens through the opposite end of the cage 22 to an outlet passage 44 which is communicable with the outlet passageway 15. The annular rib 25b, it will be observed, separates the inlet passage 40 from the outlet passage 44. Ribs 24b and 26b serve in turn to close off the passages 40, 44 from the hollow interior of the valve body.

A cylindrically shaped sleeve valve member 45 is positioned within the chamber 42 and has its outer surface in sliding contact with the inner surface of the cage 22 and has lips 46, 47 which are cooperable with the ports 41, 43 to control the flow fluid therethrough. It will be observed incidentally that the inlet passage 40 describes an annulus and that ports 41 are formed at several locations around the circumference of the cage 22 at the left-handmost end thereof as are outlet ports 43 formed at several points around the cage 22 at the right-handmost end thereof. The outlet passage 44 likewise describes an annulus which is communicable with each of the outlet ports. It will be observed that when the valve member 45 is in the position illustrated in FIGURE 1 with the lip 46 seated on the inner surface of rib 24b, no fluid can pass from the inlet passageway 14 into the chamber 42 and that, likewise, no fluid would be permitted to pass through the outlet passageway 15 if the valve member 45 were in its extreme right-hand position with the lip 47 seated on the inner surface of rib 26.

A temperature sensitive power unit F is mounted in a fixed position at the left-handmost end of the cylindrical section 19 and this power unit is of the remote sensing type and includes a casing 48 having an enlarged portion 49 abutting the outer end surface of the cylindrical section 19 and a power member guide portion 50 extending through the end wall of the cylindrical section 19 and serving as a guide for a reciprocably movable power member or piston 51. A plurality of fingers 52 are swaged over the inner surface of the end wall of the cylindrical section 19 to maintain the power unit in its fixed position. A filling tube 53 extends from the casing 48 as does a capillary 54 which leads to and communicates with the interior of a thermal sensing bulb 17. As is well understood in the art, the bulb 17 may contain a substance which will expand as ambient temperatures rise and such expansion is communicated through the capillary 54 to a movable wall or a diaphragm contained within the casing 48 to effect extensible movement of the power member 51 from the guide 50.

For ease of explanation it will suffice at this point to say that there is an interconnection between the power member 51 and the valve member 45 so that as temperatures ambient the bulb 17 rise, the valve member 45 will be urged to move toward the right as viewed in the sectional figures.

Let it be assumed then that the valve as shown in FIGURE 1 is oriented for summer operation and that cold water is being circulated from the inlet passageway 14 to the inlet passage 40 and thence through the bypass passageway 16. As temperatures ambient the sensing bulb 17 rise, the valve member 45 will be moved toward the right and cold water will then be permitted to travel through the port 41 and into the chamber 42 and thence to port 43 to the outlet passageway 15 from whence it will travel to the radiator to cool the zone within which the sensing bulb 17 is mounted.

It should be also noted that extension limits of the power member 51 are such that (all other parts remaining as shown in FIGURE 1) the valve member 45 will be moved to a point such that the lip 47 is still short of covering any portion of the ports 43 when the power member 51 is in its most extended position.

It will also be observed that the valve member carrying cage 22 is axially movable within the valve body 10 and that by moving the cage to the right as viewed in the sectional figures, the valve operating temperature range of the power unit F can be altered to operate at a higher temperature. The cage 22 could in fact be moved far enough to the right as viewed in the sectional figures by the manual adjustment knob 28 so that even in its most extended position the power member 51 would contact no element which would be effected to unseat the valve member lip 46 from the rib 24. Under this circumstance no cold water would be circulated to the radiator regardless of the temperature conditions ambient the bulb 17.

The inner wall of the valve member 45 is grooved at its left-handmost end and an annular retainer 55 is seated within its groove and serves as a seat for a metal disk 56. A metal stirrup 57 has outturned feet 58 seated on the disk 56 and is maintained in this disk seated position by a compression spring 59 which is interposed between the feet 58 and an inwardly extending annular rib 60 which is formed integrally with the valve member 45. An outwardly opening groove is formed within the rib 60 and serves as a seat for a seal 61 which serves to seal the valve member 45 to the cylindrical cage 22.

A valve orienting temperature sensitive power unit O, has a guide portion 62 fitted rather snugly within a radially reduced portion 63 of the stirrup 57 and has a center ring section 64 fitted within a diametrically enlarged portion 65 of the stirrup 57 and has a temperature sensing portion 66 which acts as a seat for the outermost end of the power member 51. This valve orienting power unit O, has a power member 67 which is guided within the guide portion 62 thereof and which seats against the central end portion of the stirrup 57.

A temperature compensating temperature sensitive power unit C has a thermal sensing portion 69, an enlarged ring portion 70, a guide 71, and a power member (not shown). The power unit C is positioned within the cylindrical sleeve 24 with its power member engaging the bridge 72 of the sleeve 24. The legs 35 embrace and threadedly engage the guide 71 of the power unit C and extend along opposite sides of the bridge 72. An element return spring 72a is provided within recess 73 formed in the shaft 29 and this spring has one end seated on the bridge 72 to bias the sleeve 24 and power member toward the left as viewed in the drawings. It will be observed that as a result of this construction rotation of shaft 29 will cause the cylindrical sleeve 24 to rotate with it, thus screwing or unscrewing the cage 22 on the sleeve 24 and thereby varying the position of the cage.

A compression spring 74 is interposed between the ring section 70 of the power unit C and a shoulder 75 formed on the stirrup 57 intermediate the radially enlarged and radially reduced portions 65 and 63 thereof but this spring is considerably weaker than the spring 59. Cage 22, valve 45, retainer 55, disk 56, stirrup 57, and the shell of power unit O are all formed of a good thermal conducting material so that the temperature of water within the inlet passage 40 can be borne to the temperature sensing portion 66 of the power unit O, by thermal conduction through the engaging metal parts so that actuation of the power unit O, can be effected as a function of the temperature of water within the inlet passage 40 even when the valve member is in a seated position closing the ports 41.

The purpose of the valve orienting power unit O is to orient the valve unit for coolant or hot water control as a function of the temperature of the water in the inlet passage 40. Such orientation is effected in the following manner. When the temperature of the water in the inlet passage 40 is low, the power unit O will be maintained in its most retracted position as is shown in FIGURE 1 by thermal conduction through the contacting metal parts and by the bias of the return spring 74. As the temperature of fluid ambient the bulb 17 rises, the power unit F will act through the power member 51 to move the power unit O towards the right as viewed in the sectional figures and due to the fact that the spring 74 is considerably weaker than the spring 59, the spring 74 will be compressed and the power unit O and valve member 45 will be moved together towards the right to uncover the inlet port 41 and permit water to circulate from the inlet passageway 14 to and through the outlet passageway 15 to the radiator. As long as the power member 67 remains in its retracted position however the valve member 45 can never be moved far enough to the right to cover even partially the outlet ports 43.

On the contrary, when hot water is passed through the system, the power member 67 will move extensibly from the guide 62 and will so orient the valve member 45 within the case 22 and relative to the ports that the lip 47 will be just adjacent and to the left of or even with the left-handmost edge of the port 43 as is shown in FIGURE 2 even though the power member 51 is in its retracted position. Under this circumstance, increases in temperature ambient the bulb 17 will cause the valve member to move from the FIGURE 2 position toward the right as is viewed in FIGURE 3 to close the port 43 to decrease the flow of water to the radiator. This of course would be a winter control position in which it is desired to reduce the flow of water to the radiator as temperatures increase. Conversely, the first arrangement described would be a summer control position in which it is desired to increase the flow of water to the radiator as temperatures increase.

In any event it will be understood that the valve orienting power unit O is used simply for the purpose of determining whether movement of the power member 51 will cause the valve member 45 to control the flow of liquid through the port 41 or through the port 43. In the one case we have a hot water control valve and in the other case we have a cold water control valve.

It will be observed again that the power unit O is sensitive to the temperature of water at the inlet passage 40 even though the valve member 45 is seated on the rib 24 due to thermal conduction through the cooperating metal parts.

Lastly, it will be observed that the compensating power unit C is considerably smaller than the power unit O and that the former power unit has a considerably smaller force than the latter. The compensating power unit is designed primarily to compensate for over-extension of the valve orienting power unit O caused when hot water actually contacts the thermal sensing portion 66 thereof and by expansion of the rubber parts therein.

Compression spring 59 serves as an over-travel spring for either one or both of the power units F and O as is well understood by those skilled in the art, but under all ordinary circumstances the power member 67 and valve member 45 may be considered as being directly connected to one another.

It will be understood that the modifications and variations in my invention can be effected without departing from the spirit and scope of the novel concepts thereof.

I claim as my invention:
1. A fluid control valve comprising:
   a valve body having a chamber formed therein defined by an elongated chamber wall having spaced inlet and outlet ports opening through said chamber wall at opposite ends thereof,
   a valve member slidable along said chamber wall between said ports and having portions cooperable with each of said ports to control fluid flow therethrough,
   temperature responsive actuating means positioned within said chamber and connected to said valve member for shifting said valve member to a flow controlling position adjacent one or the other of said ports as a function of the temperature of fluid at said inlet port,
   spring means biasing said valve member in one direction,
   means energizable as a function of temperature remote from said valve for moving said valve member relative to said ports,
   whereby said last-named means in conjunction with said spring means will cause said valve member to cover and uncover only that port to which said valve member is adjacent as a function of temperature in a region remote from the valve, and
   manual means for moving said valve member and said chamber wall relative to said last-named means.

2. A fluid control valve comprising:
   a hollow valve body having an elongated cage slidably mounted within said valve body along its longitudinal axis, means for moving said cage within its slidable mounting,
   inlet and outlet ports formed at opposite ends of said cage,
   a valve member carried within and by said cage and slidable along the wall thereof and cooperable with each of said ports to control fluid flow therethrough,
   a temperature sensitive power unit positionable within the interior of said valve body having an element extensible therefrom upon energization of said unit,
   means interconnecting said element with said valve member to shift said valve member to a flow controlling position adjacent one or the other of said ports,
   means energizing said power unit as a function of the temperature of fluid at said inlet port, and
   means engageable with said power unit for moving said power unit and valve member so that said valve member covers and uncovers the port to which it is adjacent.

3. A fluid control valve comprising:
   a hollow valve body having an elongated cage slidably mounted in said valve body along a longitudinal axis,
   inlet and outlet ports formed at opposite ends of said cage,
   a valve member carried within and by said cage and slidable along the wall thereof and cooperable with each of said ports to control fluid flow therethrough,
   a temperature sensitive power unit positioned within the interior of said valve body having an element extensible therefrom upon energization thereof,
   means interconnecting said element with said valve member to shift said valve to a flow controlling position adjacent one or the other of said ports,
   means energizing said power unit as a function of the temperature of fluid at said inlet port,
   power means engageable with said power unit for moving said power unit and said valve member to cause said valve member to cover and uncover the port to which it is adjacent, and
   means sensitive to temperatures in an area remote from said valve body for energizing said power means as a function of temperature variances in that remote area.

4. A fluid control valve comprising:
   a hollow valve body having an elongated cage slidably mounted within said valve body along its longitudinal axis,
   inlet and outlet ports formed at opposite ends of said cage, a valve member carried within and by said cage and slidable along the wall thereof and cooperable with each of said ports to control fluid flow therethrough, a temperature sensitive power unit positioned within the interior of said valve body having an element extensible therefrom upon energization thereof, and engageable with said valve member to effect movement thereof, whereby said valve member is in a position to control fluid flow through one or the other of said ports when said element is respectively in a retracted or extended position, means energizing said power unit as a function of the temperature of fluid at said inlet port, a second temperature sensitive power unit fixed in said valve body and having an element engageable with said first mentioned power unit, whereby movement of said second-mentioned element will effect movement of said first-mentioned power unit within said valve body, and means energizing said second-mentioned power unit as a function of temperatures in an area remote from said valve body.

5. A fluid control valve constructed in accordance with claim 4 and including means for moving said cage relative to said second-mentioned temperature sensitive power unit.

6. A fluid control valve constructed in accordance with claim 4 and including manual means for moving said cage relative to said second-mentioned temperature sensitive power unit.

7. A fluid control valve comprising:

a hollow valve body having an elongated cage slidably mounted within said valve body along its longitudinal axis, inlet and outlet ports formed at opposite ends of said cage, an inlet and outlet in said valve body communicable at all times with said ports regardless of the position of said cage within said valve body, a valve member carried within and by said cage and slidable along the wall thereof and cooperable with each of said ports to control fluid flow therethrough, a temperature sensitive power unit positioned within said valve body and carried by said cage and having an element extensible therefrom upon energization of said unit, means interconnecting said element with said valve member to shift said valve member to a flow controlling position adjacent one or the other of said ports, means energizing said power unit as a function of the temperature of fluid at said inlet port, a second temperature sensitive power unit fixedly mounted within said valve body in opposition to said first-mentioned power unit and having its temperature sensing portion exposed to fluid contained within the hollow interior of said valve body, a compression spring interposed between said units, whereby the potential power output of said second-mentioned power unit is substantially less than that of the first power unit, means energizing said first-mentioned power unit as the function of the temperature of fluid at said inlet port, and valve member moving means connected to said first-mentioned power unit to cause said valve member to cover and uncover that port to which it is adjacent.

8. A fluid control valve constructed in accordance with claim 7 wherein manual adjusting means are also cooperable with said cage to provide a means for moving said cage relative to said valve member moving means.

9. A fluid control valve comprising:

a hollow valve body having an elongated cage slidably mounted within said valve body along its longitudinal axis, inlet and outlet ports formed at opposite ends of said cage, a valve member carried within and by said cage and slidable along the wall thereof and cooperable with each of said ports to control fluid flow therethrough, a temperature sensitive power unit positioned within the interior of said valve body having an element extensible therefrom upon energization thereof, whereby said valve member is in a position to control fluid flow through one or the other of said ports when said element is respectively in a retracted or extended position, means energizing said power unit as a function of the temperature of fluid at said inlet port, a second temperature sensitive power unit fixedly mounted within said valve body in opposition to said first-mentioned power unit and having its temperature sensing portion exposed through fluid contained within the hollow interior of said valve body, a compression spring interposed between said units, whereby the potential power output of said second-mentioned power unit is substantially less than that of the first power unit, a third temperature sensitive power unit fixed in said valve body and having an element engageable with said first mentioned power unit, whereby movement of said third-mentoned element will effect movement of said first-mentioned power unit within said valve body and means energizing said third-mentioned power unit as a function of the temperature in an area remote from said valve body.

10. A fluid control valve comprising:

a hollow valve body having an elongated cage slidably mounted within said valve body along its longitudinal axis, inlet and outlet ports formed at opposite ends of said cage, a valve member carried within and by said cage and slidable along the wall thereof and cooperable with each of said ports to control fluid flow therethrough, a temperature sensitive power unit positioned within the interior of said valve body having an element extensible therefrom upon energization thereof, whereby said valve member is moved to a position to control fluid flow through one or the other of said ports by said element when said element is respectively in a retracted or extended position, said valve member and said cage being formed of a thermally conductive material, thermally conductive means interconnecting the temperature sensing portion of said power unit and said valve member, whereby said power unit is energized as a function of the temperature of fluid at said inlet passage when said inlet port is in a closed position, a second temperature sensitive power unit fixed in said valve body and having an element engageable with said first mentioned power unit, whereby movement of said second-mentioned element will effect movement of said first-mentioned power unit within said valve body, and means energizing said second-mentioned power unit as a function of the temperature in an area remote from said valve body.

11. A fluid control valve comprising:

a hollow valve body having an elongated cage slidably mounted within said valve body along its longitudinal axis, inlet and outlet ports formed at opposite ends of said cage, an inlet and outlet in said valve body communicable at all times with said ports regardless of the position of said cage within said valve body,
a valve member carried within and by said cage and slidable along the wall thereof and cooperable with each of said ports to control fluid flow therethrough,
a temperature sensitive power unit positioned within said valve body and carried by said cage and having an element extensible therefrom upon energization of said unit,
means interconnecting said element with said valve member to shift said valve member to a flow controlling position adjacent one or the other of said ports,
means energizing said power unit as a function of the temperature of fluid at said inlet port,
said valve member and said cage being formed of a thermally conductive material,
thermally conductive means interrconnecting the temperature sensing portion of said power unit and said valve member, whereby said power unit is energized as a function of the temperature of fluid at said inlet port when said inlet passage is in closed position,
a second temperature sensitive power unit fixedly mounted within said valve body in opposition to said first-mentioned power unit and having its temperature sensing portion exposed through fluid contained within the hollow interior of said valve body,
a compression spring interposed between said units, whereby the potential power output of said second-mentioned power units is substantially less than that of the first power unit, and
valve member moving means connected to said first-mentioned power unit to cause said valve member to cover and uncover that port to which it is adjacent.

12. A fluid control valve comprising:
a valve body having a chamber formed therein defined by an elongated chamber wall having spaced inlet and outlet ports opening to said chamber wall at opposite ends thereof,
a thermally conductive valve member slidable along said chamber wall between said ports and having portions cooperable with each of said ports to control fluid flow therethrough,
a temperature responsive actuating element positioned within said chamber and having a power member extensible therefrom upon energization thereof, an over-travel spring interconnecting said power member with said valve member whereby said valve member will be moved to a flow controlling position adjacent one or the other of said ports by said power member,
wherein the temperature sensing portion of said element is in thermal contact with said valve member, so that actuation of said power unit is effected as a function of the temperature of fluid at said inlet port when said port is in a closed position,
spring means biasing said valve member in one direction, and
means energizable as a function of temperature remote from said valve for moving said valve relative to said ports,
whereby said last named means in conjunction with said spring means will cause the valve member to cover and uncover only that port to which said valve member is adjacent as a function of temperature in a region remote from the valve.

13. A fluid control valve comprising:
a hollow valve body having an elongated cage slidably mounted within said valve body along its longitudinal axis, means for moving said cage within its slidable mounting,
inlet and outlet ports formed at opposite ends of said cage,
a valve member carried within and by said cage and slidable along the wall thereof and cooperable with each of said ports to control fluid flow therethrough,
a temperature sensitive power unit positioned within the interior of said valve body having an element extensible therefrom upon energization thereof,
an overtravel spring interconnecting said power member with said valve member whereby said valve member will be moved to a flow controlling position adjacent one or the other of said ports by said power member,
wherein the temperature sensing portion of said element is in thermal contact with said valve member, so that actuation of said power unit is effected as a function of the temperature of fluid of said inlet port,
a second temperature sensitive power unit fixed in said valve body and having an element engageable with said first mentioned power unit,
whereby movement of said second-mentioned element will effect movement of said first-mentioned power unit within said valve body, and
means energizing said second-mentioned power unit as a function of the temperature in an area remote from said valve body.

14. A fluid control valve comprising:
a valve body having a chamber formed therein defined by an elongated chamber wall having spaced inlet and outlet ports opening to said chamber wall at opposite ends thereof,
a thermally conductive valve member slidable along said chamber wall between said ports and having portions cooperable with each of said ports to control fluid flow therethrough,
a temperature responsive actuating element positioned within said chamber and connected to said valve member for shifting said valve member to a flow control position adjacent one or the other of said ports as a function of the temperature of fluid at said inlet port,
wherein the temperature sensing portion of said element is in thermal contact with said valve member,
spring means biasing said valve member in one direction,
power means energizable as a function of temperature remote from said valve for moving said valve relative to said ports, and
manual means for moving said valve member and chamber wall relative to said power means.

15. A fluid control valve comprising:
a hollow valve body having an elongated cage slidably mounted within said valve body along its longitudinal axis,
manual means for moving said cage within said valve body,
inlet and outlet ports formed at opposite ends of said cage,
a valve member carried within and by said cage and slidable along the wall thereof and cooperable with each of said ports to control fluid flow therethrough,
a temperature sensitive power unit positionable within the interior of the valve body having an element extensible therefrom upon energization of said unit,
means interconnecting said element with said valve member to shift said valve member to a flow controlling position adjacent one or the other of said ports,
means energizing said power unit as a function of the temperature of fluid at said inlet port, and
means engageable with said power unit for moving said power unit and valve member so that said valve member covers and uncovers the port to which it is adjacent.

16. A fluid control valve comprising:
a hollow valve body having an elongated cage slidably mounted within said valve body along its longitudinal axis, inlet and outlet ports formed at opposite ends of said cage, a valve member carried within and by said cage and slidable along the wall thereof and cooperable with each of said ports to control fluid flow therethrough, a temperature sensitive power unit positioned within the interior of said valve body having an element extensible therefrom upon energization of said unit, means interconnecting said element with said valve member to shift said valve member to a flow controlling position adjacent the one or the other of said ports, means energizing said power unit as a function of the temperature of fluid at said inlet port, means engageable with said power unit for moving said power unit and valve member so that said valve member covers and uncovers the port to which it is adjacent, and means independent of said temperature sensitive power unit for moving said cage within said valve body.

References Cited by the Examiner
UNITED STATES PATENTS

| | | | |
|---|---|---|---|
| 2,463,599 | 3/1949 | Branson | 236—93 |
| 2,575,100 | 11/1951 | Duey | 236—93 |
| 2,776,796 | 1/1957 | Mosely | 236—1 |
| 2,805,025 | 9/1957 | Dillman | 236—1 |
| 2,835,446 | 5/1958 | Dillman | 236—1 |

EDWARD J. MICHAEL, *Primary Examiner.*